United States Patent
Bax et al.

(10) Patent No.: US 7,899,766 B2
(45) Date of Patent: Mar. 1, 2011

(54) BOUNDING ERROR RATE OF A CLASSIFIER BASED ON WORST LIKELY ASSIGNMENT

(76) Inventors: Eric Theodore Bax, Altadena, CA (US); Augusto Daniel Callejas, Pasadena, CA (US)

( * ) Notice: Subject to any disclaimer, the term of this patent is extended or adjusted under 35 U.S.C. 154(b) by 568 days.

(21) Appl. No.: 12/069,129

(22) Filed: Feb. 7, 2008

(65) Prior Publication Data

US 2009/0204559 A1   Aug. 13, 2009

(51) Int. Cl.
*G06F 15/18* (2006.01)
*G06F 11/07* (2006.01)

(52) U.S. Cl. .......................... 706/20; 706/25
(58) Field of Classification Search .................. 706/25, 706/20; 435/7.24, 7.92; 702/19, 69, 181
See application file for complete search history.

(56) References Cited

PUBLICATIONS

Holden, Sean B, PAC-like upper bounds for the sample complexity of leave-one-out cross-validation, Annual Workshop on Computational Learning Theory: Proceedings of the ninth annual conference on Computational learning theory; Jun. 28-Jul. 1, 1996. pp. 41-50, 1996.*

Audibert, J.-Y. (2004). PAC-Bayesian statistical learning theory. PhD thesis, Laboratoire de Probabilities et Modeles Aleatoires, Universites Paris 6 and Paris 7; 2004. http://cermis.enpc.fr/~audibert/ThesePack.zip.

Bax, E. (1999). Partition-based and sharp uniform error bounds. IEEE Transactions on Neural Networks vol. 10, No. 6, 1315-1320. USA.

Blum, A. and Langford, J. (2003). PAC-MDL bounds. Proceedings of the 16th Annual Conference on Computational Learning Theory (COLT), 344-357. USA.

Catoni, O. (2003). A PAC-Bayesian approach to adaptive classification. Preprint n.840, Laboratoire de Probabilities et Modeles Aleatoires, Universites Paris 6 and Paris 7. 2003. France.

Catoni, O. (2004). Improved Vapnik-Chervonenkis bounds. Preprint n. 942, Laboratoire de Probabilities et Modeles Aleatoires, Universites Paris 6 and Paris 7. 2004. France.

Cristianini, N. and Shawe-Taylor, J. (2000). An Introduction to Support Vector Machines and Other Kernel-Based Learning Methods. Cambridge University Press. USA.

Derbeko, P., El-Yaniv, R., and Meir, R. (2003). Error bounds for transductive learning via compression and clustering. Advances in Neural Information Processing Systems (NIPS) 16 MIT Press Cambridge MA.

(Continued)

*Primary Examiner*—Donald Sparks
*Assistant Examiner*—Ola Olude-Afolabi

(57) ABSTRACT

Given a set of training examples—with known inputs and outputs—and a set of working examples—with known inputs but unknown outputs—train a classifier on the training examples. For each possible assignment of outputs to the working examples, determine whether assigning the outputs to the working examples results in a training and working set that are likely to have resulted from the same distribution. If so, then add the assignment to a likely set of assignments. For each assignment in the likely set, compute the error of the trained classifier on the assignment. Use the maximum of these errors as a probably approximately correct error bound for the classifier.

7 Claims, 1 Drawing Sheet

OTHER PUBLICATIONS

Devroye, L., Gyorfi, L., and Lugosi, G. (1996). A Probabilistic Theory of Pattern Recognition. Springer-Verlag, New York.

El-Yaniv, R. and Gerzon, L. (2005). Effective transductive learning via objective model selection. Pattern Recognition Letters, 26(13):2104-2115. USA.

Joachims, T. (2002). Learning to Classify Text using Support Vector Machines. Kluwer Academic Publishers. USA.

Littlestone, N. and Warmuth, M. (1986). Relating data compression and learnability. Unpublished manuscript, University of California Santa Cruz.

Vapnik, V. and Chervonenkis, A. (1971) On the uniform convergence of relative frequencies of events to their probabilities. Theory of Probability and its Applications 16 264-280 USA.

Vapnik, V. (1998). Statistical Learning Theory. John Wiley & Sons. USA.

* cited by examiner

US 7,899,766 B2

BOUNDING ERROR RATE OF A CLASSIFIER BASED ON WORST LIKELY ASSIGNMENT

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

Training or developing a classifier is a process of producing a rule that can be used to figure out how to classify examples not necessarily used in training. For example, a classifier may be developed to determine which medicine to prescribe to a cancer patient. The classifier may be developed based on training examples, each consisting of a set of medical data about a patient and which drug was most effective for the patient. Then the classifier may be applied to a set of working examples, each consisting of a set of medical data about a patient for whom no drugs have been tried. (A "class" in this scenario is a set of patients for which the same drug offers the most benefit.) The goals are (1) to train a classifier that effectively determines which drug to administer to which patient and (2) to evaluate how effective that classifier is likely to be. This second goal is called validation, or producing an error bound for a classifier. Validation is the focus of this invention.

Now we discuss prior art. An error bound based on VC dimension (Vapnik and Chervonenkis 1971; Vapnik 1998) uses uniform bounds over the largest number of assignments possible from a class of classifiers, based on worst-case arrangements of training and working examples. However, as the number of training examples grows, the probability that training error is a good approximation of working error is so great that the VC error bound succeeds in spite of using uniform bounds based on worst-case assumptions about examples. Also, it is easy to compute VC bounds for any number of examples, assuming the VC dimension for the class is known. This makes VC bounds useful and convenient for large data sets, i.e., data sets having thousands of examples. However, VC error bounds have some drawbacks: they are ineffective for smaller data sets, and they do not apply to some classifiers, such as nearest neighbor classifiers.

Transductive inference (Vapnik 1998) is a training method that uses information provided by inputs of working examples in addition to information provided by training examples. The idea is to develop the best classifier for the inputs of the specific working examples at hand rather than develop a classifier that is good for general inputs and then apply it to the working examples. Transductive inference improves on general VC bounds by using the actual working example inputs, instead of a worst-case arrangement of inputs, to find the number of different assignments that classifiers in each training class can produce. The bounds are then used to select among classes, mediating a tradeoff between small classes that are more likely to have good generalization and large classes that are more likely to capture the dynamics of the training data.

BRIEF SUMMARY OF THE INVENTION

This invention is a PAC (probably approximately correct) error bound for classification. The method uses information from the training examples and inputs of working examples to develop a set of likely assignments to outputs of the working examples. A likely assignment with maximum error determines the bound. The method is very effective for small data sets.

The error bound presented in this invention is designed to provide error bounds for data sets so small that other bounds are ineffective. Like transductive inference, the error bound presented here uses information provided by the inputs of the working examples in addition to information provided by the training examples. But it also uses information provided by the training procedure rather than just the class of all classifiers that can be produced by the training procedure.

The error bound is based on the fact that if the training and working examples are generated independently and identically distributed (i.i.d.), then each partition of the complete set of training and working examples into a training set and a working set is equally likely. Several error bounds for machine learning are based on this principle. Examples include VC error bounds (Vapnik and Chervonenkis 1971, Cristianini and Shawe-Taylor 2000, Section 4.2, p. 55), error bounds for support vector machines (Vapnik 1998, Chapter 8, pp. 339-343), compression-based error bounds (Littlestone and Warmuth 1986), and uniform error bounds based on constraints imposed by patterns of agreement and disagreement among classifiers over the working inputs (Bax 1999).

DETAILED DESCRIPTION OF THE INVENTION

1. Overview

Figure 1:
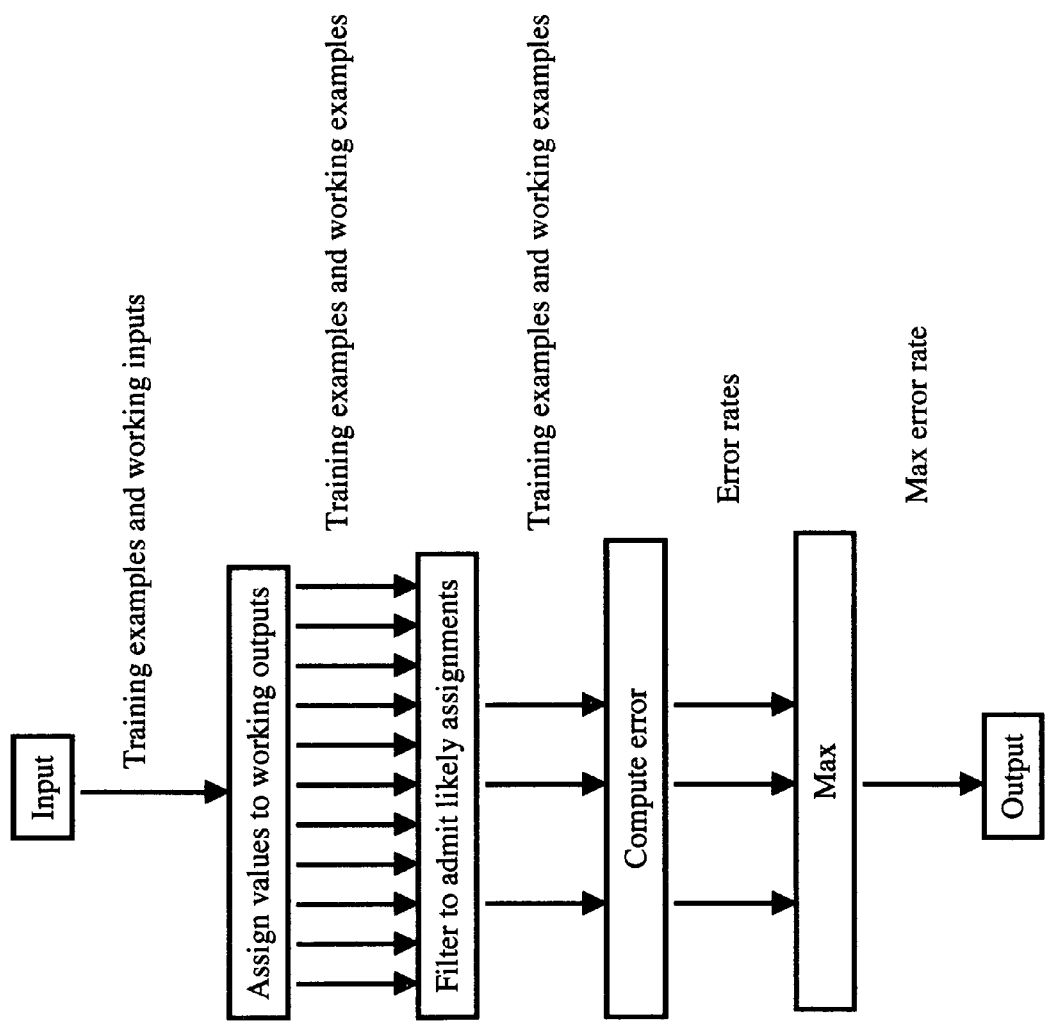
FIG. 1 is a flowchart that illustrates the process of bounding error rate based on a worst likely assignment.

This specification is organized as follows. Section 2 introduces concepts and background for the error bound. Section 3 presents the error bound. Section 4 introduces sampled filters, which reduce computation required for the bound. Section 5 analyzes speed and storage requirements for filters based on all partitions and for sampled filters. Section 6 introduces filters based on virtual partitioning, which do not require explicit computation over multiple partitions of the data into different training and working sets. Section 7 gives an efficient algorithm to compute an error bound for a 1-nearest neighbor classifier. Section 8 presents test results comparing bounds produced by different filters on a set of problems. Section 9 gives an alternative efficient error-bounding algorithm for nearest neighbor classifiers. Section 10 gives error bounding methods for the case of a single working example and for the case of unknown working examples. Section 11 is a concluding summary.

2. Concepts and Background

This invention deals with learning from examples. Each example Z consists of input data Z.x and a class label Z.y$\in\{0, 1\}$. Examples are drawn i.i.d. from a joint distribution of inputs and labels to form a complete sequence $$C = Z_1, \ldots, Z_{t+w}. \tag{2.1}$$

The first t examples in the complete sequence form the training set T, and the last w examples form the working set W.

We know inputs and labels for examples in the training set, and we know inputs, but not labels, for examples in the working set. We have a training procedure that uses training set examples and working set inputs to develop a classifier g. Let I be the indicator function—one if the argument is true and zero if false. The goal is to produce a PAC (probably approximately correct) bound on the error $$E = \frac{1}{w}\sum_{i=1}^{w} I(g(Z_{t+i} \cdot x) \neq Z_{t+i} \cdot y). \quad (2.2)$$

The basic idea behind transductive error bounds is that each permutation of a complete sequence is equally likely to occur, because the examples are drawn i.i.d. (For some ways of developing and using this idea, refer to Audibert 2004, Blum and Langford 2003, Catoni 2003, Catoni 2004, Derbeko et. al. 2003, El-Yaniv and Gerzon 2005, and Vapnik 1998.) The bounds in this invention consider different possible assignments to the unknown labels of the working set examples. So we introduce some notation around assignments and permutations. For any assignment $a \in \{0,1\}^w$ and any permutation $\sigma$ of $\{1, \ldots, t+w\}$, let $C(a, \sigma)$ be the sequence that results from assigning labels to the working examples in C:

$$\forall i \in \{1, \ldots, w\}: Z_{t+i}.y = a_i, \quad (2.3)$$

then permuting the sequence according to $\sigma$. Let $T(a, \sigma)$ be the set consisting of the first t examples in $C(a, \sigma)$. Let $W(a, \sigma)$ be the set consisting of the last w examples in $C(a, \sigma)$. Let $g(a, \sigma)$ be the classifier produced by applying the training procedure with $T(a, \sigma)$ as the training set and $W(a, \sigma)$ as the working set. Let $E(a, \sigma)$ be the error of $g(a, \sigma)$ over $W(a, \sigma)$; in other words, let $E(a, \sigma)$ be the error E as defined in (2.2) that would result from using $C(a, \sigma)$ as the complete sequence.

Let a* be the actual (unknown) labels of the working examples. Let Id be the identity permutation. Then $$E = E(a^*, Id). \quad (2.4)$$

3. Error Bound and Algorithm

3.1 Bound

Let Id be the identity permutation. Define a likely set $$L = \{a \in \{0,1\}^w | P[E(a,\sigma) \geq E(a, Id)] > \delta\}, \quad (3.1)$$

where the probability is over the uniform distribution of permutations $\sigma$ of $\{1, \ldots, t+w\}$. The bound is $$\max_{a \in L} E(a, Id). \quad (3.2)$$

Theorem 3.1

With probability at least $1-\delta$, $$E(a^*, Id) \leq \max_{a \in L} E(a, Id), \quad (3.3)$$

where the probability is over random complete sequences drawn i.i.d. from a joint input-label distribution.

Proof of Theorem 3.1

If $a^* \in L$, then (3.3) holds. So it suffices to show that $$P_C(a^* \notin L) \leq \delta, \quad (3.4)$$

where subscript C denotes probability over the distribution of complete sequences C. By the definition of L, the LHS is $$= P_C[P_\sigma[E(a^*,\sigma) \geq E(a^*, Id)] \leq \delta | C], \quad (3.5)$$

where subscript $\sigma$ denotes probability over the uniform distribution of permutations $\sigma$ of $\{1, \ldots, t+w\}$. Convert the probability over the distribution of complete sequences to an integral over complete sequences:

$$\int_C I(P_\sigma[E(a^*, \sigma) \geq E(a^*, Id)] \leq \delta | C) p(C) dC, \quad (3.6)$$

where p(C) is the pdf of C. Since each permutation of a complete sequence is equally likely, we can replace the integral over complete sequences by an integral over sequences Q of t+w examples followed by an average over permutations $\sigma'$ of Q to form complete sets:

$$= \int_Q \frac{1}{(t+w)!} \sum_{\sigma'} I(P_\sigma[E(a^*, \sigma) \geq E(a^*, \sigma')] \leq \delta | C = \sigma'Q) p(Q) dQ. \quad (3.7)$$

For each set Q, only $\delta (t+w)!$ or fewer permutations $\sigma'$ can rank in the top $\delta (t+w)!$ of all $(t+w)!$ permutations for any statistic, including the statistic $E(a^*, \sigma)$. So, $$\forall Q: \sum_{\sigma'} I(P_\sigma[E(a^*, \sigma) \geq E(a^*, \sigma')] \leq \delta | Q) \leq \delta(t+w)!. \quad (3.8)$$

Substitute this inequality into (3.7), to show it is $$\leq \int_Q \frac{1}{(t+w)!} \delta(t+w)! p(Q) dQ. \quad (3.9)$$

Cancel terms $(t+w)!$ and integrate to get $\delta$, completing the proof.

3.2 From Permutations to Partitions

For each assignment $a \in \{0,1\}^w$ and each size-t subset S of $\{1, \ldots, t+w\}$, let $T(a, S)$ be the set (or multi-set) of examples in $C(a, Id)$ indexed by entries of S, and let $W(a, S)$ be the remaining examples in $C(a, Id)$. Refer to the pair $T(a, S)$ and $W(a, S)$ as the partition induced by S. Let $g(a, S)$ be the classifier that results from training with $T(a, S)$ as the training set and $W(a, S)$ as the working set. Let $E(a, S)$ be the error of $g(a, S)$ over $W(a, S)$.

For each permutation $\sigma$ of $\{1, \ldots, t+w\}$, let $\sigma_i$ be the position in $C(a, Id)$ of the example in position i in $C(a, \sigma)$. Note that $$\{\sigma_1, \ldots, \sigma_t\} = S \Rightarrow (T(a,\sigma), W(a,\sigma)) = (T(a,S), W(a,S)). \quad (3.10)$$

For each S, there is the same number, t!w!, of permutations $\sigma$ with $\{\sigma_1, \ldots, \sigma_t\} = S$, because there are t! ways to order the elements of S in $\sigma_1, \ldots, \sigma_t$ and w! ways to order the remaining elements of $\{1, \ldots, t+w\}$ in $\sigma_{t+1}, \ldots, \sigma_{t+w}$. Since there is this t!w!-to-one mapping from permutations $\sigma$ to subsets S with $E(a, \sigma) = E(a, S)$, the probability over permutations in the definition of L can be replaced by the following probability over partitions induced by subsets S:

$$L=\{a\in\{0,1\}^w | P_S[E(a,S) \geq E(a,S^*)] > \delta\}, \quad (3.11)$$

where the probability is uniform over size-t subsets S of $\{1, \ldots, t+w\}$, and $S^* = \{1, \ldots, t\}$. Hence, we can compute errors E(a, S) over size-t subsets S rather than over all permutations in order to compute bound (3.2).

3.3 Algorithm

Given an array C of t training examples followed by w working examples and a bound failure probability ceiling $\delta$, Algorithm 3.3.1 returns a valid error bound with probability at least $1-\delta$.

Algorithm 3.3.1

```
procedure bound(C, delta)
    bound := 0; // Variable bound stores the running max of errors for
    likely assignments.
    for (a in {0,1}^w) // Try all assignments.
        if (E(a, {1, . . . , t}, C) > bound) // Check if error is high enough to be
        a new max.
            f[0 . . . w] = 0; // Variable f[i] stores the frequency of E(a, S) = i/w.
            for (S subset of {1, . . . , t+w} with |S|=t) f[E(a, S, C)]++;
            // Find error frequencies.
            tail := 0; // Variable tail stores the frequency of error greater than
            for S={1, . . . , t}.
            for (i=E(a, {1, . . . , t}, C) to w) tail += f[i]; // Sum the tail.
            if (tail > delta) bound := E(a, {1, . . . , t}, C); // If assignment is
            likely, increase bound.
        end if
    end for
    return bound;
end procedure
```

The procedure E(a, S, C), which is not shown, computes E(a, S) by assigning a to the labels of the last w entries in C, training a classifier using the entries of C indicated by S as the training set and the remaining entries as the working set, and returning the error of that classifier over that working set.

4. Sampled Filters and Ranking with Random Tie Breaking

The goal is to reject from L as many false assignments a as possible among those that have $E(a, Id) > E(a^*, Id)$, while only rejecting $a^*$ in a fraction $\delta$ or fewer of cases. The bound process in the previous section rejects assignments a for which $E(a, S^*)$ is abnormally high among errors E(a, S) over subsets S of $\{1, \ldots, t+w\}$, i.e., among partitions of the complete sequence into training and working sets. For each assignment a, the process is equivalent to ranking all subsets S in order of E(a, S), finding the fraction of subsets that outrank $S^*$, even with $S^*$ losing all ties, and rejecting a if the fraction is $\delta$ or less. Call this filter the complete filter, because it compares $S^*$ to all subsets S. This section introduces alternative filters that do not require computation over all subsets and a random tie breaking process that ranks $S^*$ fairly among subsets S having the same error instead of having $S^*$ lose all ties.

4.1 Sampled Filters

The complete filter is expensive to compute. To motivate thinking about alternative filters, note that any filter that accepts $a^*$ into L with probability at least $1-\delta$ produces a valid bound. For example, a filter that simply makes a random determination for each assignment, accepting it into L with probability $1-\delta$, independent of any data about the problem at hand, still produces a valid error bound. Of course, this random filter is unlikely to produce a strong bound, because it does not preferentially reject assignments a that have high error $E(a, S^*)$.

The following sampled filter, based on errors E(a, S) over a random sample of subsets S, rejects assignments with high error $E(a, S^*)$, and it is less expensive to compute than the complete filter. For each assignment a, generate a sample of n size-t subsets S of $\{1, \ldots, t+w\}$. Generate the sample by drawing subsets i.i.d. with replacement based on a uniform distribution over subsets, or generate the sample by drawing subsets i.i.d. without replacement based on a distribution that is uniform over subsets other than $S^*$ and has zero probability for $S^*$. After drawing the sample by either method, add $S^*$ to the sample. Then use the sample in place of the set of all subsets S in the algorithm, i.e., accept assignment a if the fraction of subsets S in the sample with E(a, S) at least $E(a, S^*)$ is greater than $\delta$. Like the complete filter, this sampled filter has probability at most $\delta$ of rejecting the true assignment Here is the proof for sampling with replacement. The proof for sampling without replacement is similar, and it is outlined after the proof for sampling with replacement.

Theorem 4.1.1

Let R be the set of all size-t subsets of $\{1, \ldots, t+w\}$. Let M be a set (or multi-set) of entries from R, drawn i.i.d. with replacement based on a uniform distribution over R. Let $$L_M = \{a \in \{0,1\}^w | P_{S \in M \cup \{S^*\}}[E(a,S) \geq E(a,S^*)] > \delta\}, \quad (4.1)$$

where the probability is uniform over all sets S in M. Then, with probability at least $1-\delta$, $$E(a^*, S^*) \leq \max_{a \in L_M} E(a, S^*), \quad (4.2)$$

where the probability is over random complete sequences C drawn i.i.d. from a joint input-label distribution and over random subset samples M.

Proof of Theorem 4.1.1

If $a^* \in L_M$, then (4.2) holds. So we will show $$P_{C,M}(a^* \notin L_M) \leq \delta, \quad (4.3)$$

where the probability is over the joint distribution of complete sequences C and subset samples M. By the definition of $L_M$, the LHS is $$= P_{C,M}[P_{S \in M \cup \{S^*\}}[E(a^*,S) \geq E(a^*,S^*)] \leq \delta | C]. \quad (4.4)$$

Convert the probability over C into an integral over sequences Q of t+w examples, followed by a probability over permutations $\sigma'$ of Q to form complete sets:

$$\int_Q P_{\sigma',M}[P_{S \in M \cup \{S^*\}}[E(a^*, S) \geq E(a^*, S^*)] \leq \delta | C = \sigma'Q] p(Q) dQ, \quad (4.5)$$

where the first probability is over a joint distribution of $\sigma'$ and M, with $\sigma'$ drawn uniformly at random from permutations of t+w elements and independently of M. For any fixed sequence Q, consider the expression from within (4.5):

$$P_{\sigma',M}[P_{S \in M \cup \{S^*\}}[E(a^*,S) \geq E(a^*,S^*)] \delta | C = \sigma'Q]. \quad (4.6)$$

Define Multi-Set $$H(Q) = \{E(a^*,S) | S \in M \cup \{S^*\}\}. \quad (4.7)$$

Random draws of σ' and M make H(Q) a multi-set of random values drawn i.i.d. from a uniform distribution over the set $$U(Q)=\{E(a^*,S)|S\subseteq\{1,\ldots,t+w\}\wedge|S|=t\}. \quad (4.8)$$

Since the elements of H(Q) are drawn i.i.d., the probability that $E(a^*, S^*)$ ranks in the top $\delta|H(Q)|$ of the positions in a ranking of entries in H(Q) is at most $\delta$. Note that (4.6) is this probability. So $$\forall Q: P_{\sigma',M}[P_{S\in M\cup\{S^*\}}[E(a^*,S)\geq E(a^*,S^*)]\leq \delta | C=\sigma'Q]\leq \delta. \quad (4.10)$$

Substitute this inequality into (4.5), showing that the LHS of (4.3) is $$\leq \int_Q \delta p(Q)\,dQ. \quad (4.9)$$

Integrate to get δ, completing the proof.

Now consider the case of sampling subsets without replacement:

Theorem 4.1.2

Let R' be the set of all size-t subsets of $\{1,\ldots,t+w\}$, except for S*. Let M' be a set of entries from R', drawn i.i.d. without replacement based on a uniform distribution over R'. Let $$L_{M'}=\{a\in\{0,1\}^w | P_{S\in M'\cup\{S^*\}}[E(a,S)\geq E(a,S^*)]>\delta\}, \quad (4.1)$$

where the probability is uniform over all sets S in M'. Then, with probability at least $1-\delta$, $$E(a^*, S^*) \leq \max_{a\in L_M} E(a, S^*), \quad (4.2)$$

where the probability is over random complete sequences C drawn i.i.d. from a joint input-label distribution and over random subset samples M.

Proof of Theorem 4.1.2

The proof is almost the same as the proof of Theorem 4.1.1, substituting M' for M. The set H(Q) becomes a set of random variables drawn i.i.d. from U(Q) without replacement, rather than with replacement. But with or without replacement, the probability that $E(a^*, S^*)$ ranks in the top $\delta |H(Q)|$ of the positions in a ranking of entries in H(Q) is at most $\delta$. Otherwise, the proof is the same.

4.2 Random Tie Breaking

Both the complete filter and the sampled filter accept an assignment if the fraction of a set of subsets S with E(a, S) at least $E(a, S^*)$ is greater than $\delta$. In essence, if other subsets S have the same error as S*, then this rule errs on the side of safety by treating those subsets S as having greater error than S*. This ensures that the bound is valid, but it makes the bound weaker than necessary. To close the gap, use random tie breaking to rank S* at random among the subsets S that have $E(a,S)=E(a,S^*)$. Let k be the number of subsets S with the same error as S*, including S* itself. Generate an integer uniformly at random in [1,k] to be the number of subsets S with the same error that rank at or above S* after random tie breaking. If that number plus the number of subsets S with error greater than for S* is a larger fraction of the partitions than $\delta$, then accept the assignment.

5. Speed and Storage Requirements for Complete and Sampled Filters

Consider the storage requirements for the bound process. Since the maximum error E(a, S) over assignments in L is obtained by maintaining a running maximum as assignments are added to L, there is no need to store L explicitly. So the storage requirements are mild, including space for a data set, for two classifiers, and for training a classifier.

Using the complete filter to produce a bound requires time to train $$O\!\left(2^w\binom{t+w}{t}\right) \quad (5.1)$$

classifiers. Using the sampled filter instead requires time to train $$O(2^w n) \quad (5.2)$$

classifiers, where n is the number of sample partitions per assignment. Both types of filters can be computed in parallel, using different machines to filter different sets of assignments, each keeping a running maximum of $E(a, S^*)$ over accepted assignments, and then finishing by fanning in the maximum over the machines.

To reduce computation, evaluate assignments a for membership in L in decreasing order of $E(a, S^*)$. When the first assignment a is accepted into L, return $E(a, S^*)$ as the error bound, and stop. To order assignments by $E(a, S^*)$, train a classifier g, and apply it to each input in W to form the assignment with zero error. Invert that assignment to form the assignment with maximum error. Invert single elements of that assignment to produce assignments with the next greatest error rates. Then invert pairs of elements, then triples, etc.

6. Virtual Partitions 6.1 Virtual Partition Filter

Define a general likely set $L_h$, based on some function h:

$$L_h=\{a\in\{0,1\}^w | P_S[h(a,S)\geq h(a,S^*)]>\delta\}, \quad (6.1)$$

where the probability is over subsets S of $\{1,\ldots,t+w\}$. Define a general error bound $$E_h(a, S) = \max_{a\in L_h} E(a, S^*). \quad (6.2)$$

If the filter $$P_S[h(a,S)\geq h(a,S^*)]>\delta \quad (6.3)$$

can be computed for each assignment a without explicitly computing h(a, S) over some subsets S, then we call it a virtual partition filter.

6.2 Leave-One-Out Filter

For example, let h(a, S) be the number of leave-one-out errors in W(a, S). (A leave-one-out error is an example in C(a) that has a different label than the closest other example in C(a), with distance based on some metric over the input domain.) A filter based on leave-one-out errors excludes assignments a that cause an improbably large fraction of the leave-one-out errors in C(a) to be in the working set. Frequencies of leave-one-out errors in W(a, S) over subsets S can be computed without explicitly iterating over the subsets. The frequencies have a hypergeometric distribution—if there are m leave-one-out errors in C(a), then $$P_S[h(a,S)=j] = \frac{\binom{m}{j}\binom{t+w-m}{w-j}}{\binom{t+w}{w}}, \quad (6.4)$$

where the probability is uniform over size-t subsets S of $\{1, \ldots, t+w\}$.

Compute the filter for each assignment as follows. Set the labels of $Z_{t+1}, \ldots, Z_{t+w}$ according to a. Then compute the number of leave-one-out errors in C(a); call it m. Next, compute frequencies:

$$\forall\, j \in \{\max(0, m-t), \ldots, \min(w, m)\}: f_j = \binom{m}{j}\binom{t+w-m}{w-j}. \quad (6.5)$$

Let $j^* = h(a, S^*)$, i.e., the number of leave-one-out errors in $W(a, S^*)$. Let $$v = \sum_{j=j^*}^{\min(w,m)} f_j. \quad (6.6)$$

For random tie breaking, subtract from v a number drawn uniformly at random from $[0, f_{j^*}-1]$. Then divide by the number of partitions:

$$\binom{t+w}{w}. \quad (6.7)$$

If the result is $\delta$ or less, then reject assignment a.

6.3 Scoring Functions

In general, let s be a scoring function on examples in C(a) that returns an integer. Let $$h(a, S) = \sum_{Z \in W(a,S)} s(Z). \quad (6.8)$$

Let n(Z) be the nearest neighbor to Z in $T \cup W - \{Z\}$. For example, when counting leave-one-out errors, $$s(Z) = \begin{cases} 1 & \text{if } n(Z) \cdot y \neq Z \cdot y \\ 0 & \text{otherwise.} \end{cases} \quad (6.9)$$

Another useful scoring function counts leave-one-out errors caused by example Z:

$$s(Z) = |\{X \in T \cup W | n(X) = Z \wedge X.y \neq Z.y\}|. \quad (6.10)$$

For scoring functions, such as this one, that have a range other than $\{0,1\}$, the hypergeometric distribution does not apply. However, dynamic programming allows efficient computation of the frequencies, as follows. Let $$c_{ijk} \equiv \left|\left\{A \subseteq \{1, \ldots, i\} \mid |A| = j \wedge \sum_{b \in A} s(Z_b) = k\right\}\right|, \quad (6.11)$$

i.e., the number of size-j subsets of the first i examples in C(a) that have sum of scores k. The base cases are $$\forall (j,k): c_{0jk} = 0 \quad (6.12)$$

except $$c_{000} = 1, \quad (6.13)$$

and $$\forall k < 0: c_{ijk} = 0. \quad (6.14)$$

The recurrence is $$c_{ijk} = c_{i-1,j,k} + c_{i-1,j-1,k-s(i)}, \quad (6.15)$$

where s(i) is the score of example i. The frequencies are:

$$P_S[h(a,S)=k] = c_{t+w,w,k}. \quad (6.16)$$

Computing an error bound using virtual partitions requires $O(2^w \text{poly}(t+w))$ time because the scoring function is computed for each of the $2^w$ assignments. (This assumes O(poly(t+w)) time to compute the filter for each assignment) The computation requires O(poly(t+w)) space since each assignment can be filtered without reference to others, and the maximum error of a likely assignment can be maintained using a single variable.

6.4 Scoring Functions for SVMs

Now consider filters with virtual partitions for support vector machines (SVMs). A leave-one-out filter can require much computation—for each assignment, training separate SVMs with each example held out in order to compute the number of leave-one-out errors. Joachims discovered a method to bound the number of leave-one-out errors based on the results of training a single SVM on all examples. The method is called $\in\alpha$-estimation (Joachims 2002, Ch. 5). Computing the $\in\alpha$-estimator involves producing a set of examples that are potential leave-one-out errors. The set can be used as the basis for a filter that is binary-valued—each example in the set scores one and each other example scores zero. The $\in\alpha$-estimation procedure can also be used as the basis of a more complex filter, because it computes scores for examples before using a threshold to determine which ones are in the set. So the scores (or discretized scores) can be used directly as the scoring function for a filter.

7. Efficient Computation of Error Bounds for 1-Nearest Neighbor Classifiers

When using virtual partitions based on leave-one-out errors to produce an error bound for a 1-nearest neighbor classifier, there is a way to avoid iterating over all assignments to compute the bound. Avoiding this iteration leads to an efficient method to compute an error bound for a 1-nearest neighbor classifier, i.e., a method that requires time polynomial in the size of the problem. This section begins with some preliminary concepts before presenting the recurrences and dynamic programming algorithm. Next there is a small example to illustrate the algorithm. Then there are details on how to compute the recurrences efficiently. This section ends with a note on how to extend the algorithm to improve the bounds by allowing random tie breaking for ranking.

7.1 Preliminaries and Concepts

To begin, ensure that each example has a unique nearest neighbor by randomly perturbing the inputs of examples that tie to be nearest neighbors to any example. Perturb by so little that no new nearest neighbor can be introduced. Repeat until each example has a unique minimum distance to another example.

Lemma 7.1.1

This form of random tie breaking makes it impossible for a cycle of three or more examples to have each example in the cycle the nearest neighbor of the next.

The proof is by contradiction. Let $n(Z)$ be the nearest neighbor of example $Z$ in $T \cup W - \{Z\}$. Suppose there is a cycle of examples $Z_1, \ldots, Z_m, Z_1$ with $m>2$ and each example the nearest neighbor of the next, i.e., $$\forall i \in \{1, \ldots, m\} : Z_i = n(Z_{i+1}), \tag{7.1}$$

and $$Z_m = n(Z_1). \tag{7.2}$$

Let d be the distance metric over example inputs. Then $$d(Z_1, Z_2) \leq \ldots \leq d(Z_m, Z_1) \leq d(Z_1, Z_2). \tag{7.3}$$

For cycles greater than length two, the tie breaking makes equality impossible. So we have $$d(Z_1, Z_2) < \ldots < d(Z_m, Z_1) < d(Z_1, Z_2). \tag{7.4}$$

Having the same distance on the left and right implies that the distance from the first example to the second is greater than itself, which is impossible, completing the proof.

Let G be a directed graph with each example in $Z_1, \ldots, Z_{t+w}$ a node and with edges $$\{(n(Z_1), Z_1), \ldots, (n(Z_{t+w}), Z_{t+w})\}, \tag{7.5}$$

i.e., an edge to each example from its nearest neighbor. By Lemma 7.1.1, G has no cycles of length greater than two. So G is a directed tree or forest, plus some directed edges that complete length two cycles by going back along tree edges. Let F be a directed forest created by removing from G one edge from each two-cycle. The algorithm to efficiently compute an error bound uses dynamic programming, starting at the leaves of F and working up to the root or roots.

7.2 Recurrences and Algorithm

Let $F(k)$ be the subtree of F rooted at example $Z_k$, i.e., $Z_k$ and all nodes that can be reached by following directed sequences of edges from $Z_k$. Let $A(i,j,k)$ be the subset of assignments in $\{0,1\}^w$ that have i leave-one-out errors among the training examples in $F(k)$ and j leave-one-out errors among the working examples of $F(k)$. Let $n(Z,T)$ be the nearest neighbor of example Z among the training examples. Define $$e_{ijky} = \max_{a \in A(i,j,k)} |\{Z \in F(k) \cap W \mid Z \cdot y = y \land Z \cdot y \neq n(Z, T) \cdot y\}| \tag{7.6}$$

i.e., it is the maximum number of working examples in the subtree of F rooted at example $Z_k$ that are misclassified by their nearest training examples, with the maximum being over assignments that have i leave-one-out errors on the training examples in the subtree, j leave-one-out errors on the working examples in the subtree, and label y on example $Z_k$. If there are no such assignments, then define $$e_{ijky} = -1, \tag{7.7}$$

to signify that the value is "undefined."

The base cases are leaves of F. For a leaf example $Z_k$ that is in T and has label y, $$e_{00ky} = 0, \tag{7.8}$$

and, for all other combinations of i, j, and y, $$e_{ijky} = -1. \tag{7.9}$$

For a leaf example $Z_k$ that is in W and has label y, $$e_{00ky} = 0, \tag{7.10}$$

$$e_{0,0,k,1-y} = 1, \tag{7.11}$$

and, for all other combinations of i, j, and y, $$e_{ijky} = -1. \tag{7.12}$$

Before defining the general recurrence, we first define some terms that express how interactions between examples and their parent examples in F influence the numbers of leave-one-errors in T and W and the error. Let $Z_i$ be an example, Let $y_i = Z_i \cdot y$, let $Z_k$ be the parent of $Z_i$ in F, and let $y_k = Z_k \cdot y$. Define $$c_T(i, y_i, k, y_k) = \begin{cases} 1 & Z_i \in T \text{ and } y_i \neq y_k \\ 0 & \text{otherwise,} \end{cases} \tag{7.13}$$

to count whether $Z_k$ having label $y_k$ causes example $Z_i$ to be a leave-one-out error in T. Define $$d_T(i, y_i, k, y_k) = \begin{cases} 1 & Z_k \in T, \; y_i \neq y_k, \text{ and } Z_i = n(Z_k) \\ 0 & \text{otherwise,} \end{cases} \tag{7.14}$$

to count whether example $Z_k$ having label $y_k$ causes example $Z_k$ to be a leave-one-out error in T. Define $$c_W(i, y_i, k, y_k) = \begin{cases} 1 & Z_i \in W \text{ and } y_i \neq y_k \\ 0 & \text{otherwise,} \end{cases} \tag{7.15}$$

to count whether example $Z_k$ having label $y_k$ causes example $Z_i$ to be a leave-one-out error in W if it has label $y_i$. Define $$d_W(i, y_i, k, y_k) = \begin{cases} 1 & Z_k \in W, \; y_i \neq y_k, \text{ and } Z_i = n(Z_k) \\ 0 & \text{otherwise,} \end{cases} \tag{7.16}$$

to count whether example $Z_i$ having label $y_i$ causes example $Z_k$ to be a leave-one-out error in W if it has label $y_k$. Define $n_T(Z)$ to be the nearest neighbor of example Z in T. Define $$h(k, y_k) = \begin{cases} 1 & Z_k \in W \text{ and } y_k \neq n_T(Z_k) \cdot y \\ 0 & \text{otherwise,} \end{cases} \tag{7.17}$$

to count whether example $Z_k$ having label $y_k$ causes example $Z_k$ to be misclassified by its nearest training example.

Let r(Z) be the parent of example Z in F. Define $$B(k) = \{b \mid r(Z_b) = Z_k\}, \quad (7.18)$$

i.e., B(k) is the set of positions in C of the children of $Z_k$ in F. Let $y_b = Z_b.y$. Then $$e_{ijky} = \max_{\substack{\forall b \in B(k): \varepsilon_{i_b j_b b y_b} \neq -1, \\ \Sigma_{b \in B(k)}[i_b + c_T(b, y_b, k, y) + d_T(b, y_b, k, y)] = i, \text{ and} \\ \Sigma_{b \in B(k)}[j_b + c_W(b, y_b, k, y) + d_W(b, y_b, k, y)] = j}} h(k, y_k) + \sum_{b \in B(k)} e_{i_b j_b b y_b}. \quad (7.19)$$

Let A(i,j) be the subset of assignments in $\{0,1\}^w$ that have i leave-one-out errors on training examples and j leave-one-out errors on working examples. Define $$v_{ij} \equiv \max_{a \in A(i,j)} |\{Z \in W \mid Z \cdot y \neq n(Z, T) \cdot y\}|, \quad (7.20)$$

i.e., the maximum error over assignments that have i leave-one-out errors on training examples and j leave-one-out errors on working examples. If there are no such assignments, then let $$v_{ij} = 0. \quad (7.21)$$

Define $$B = \{b \mid Z_b \text{ is a root of } F\}. \quad (7.22)$$

Then $$v_{ij} = \max_{\substack{\forall b \in B: e_{i_b j_b b y_b} \neq -1, \\ \Sigma_{b \in B} i_b = i, \text{ and} \\ \Sigma_{b \in B} j_b = j}} \sum_{b \in B} e_{i_b j_b b y_b}. \quad (7.23)$$

Let $u_{ij}$ be the probability that j or more leave-one-out errors are in W(S) for a random size-t subset S of $\{1, \ldots, t+w\}$, given that there are i+j leave-one-out errors in $T \cup W$. Then $$u_{ij} = \sum_{z=j}^{\min(w, i+j)} \frac{\binom{i+j}{z}\binom{t+w-i-j}{w-z}}{\binom{t+w}{w}}. \quad (7.24)$$

For a given δ, the value $$\max_{u_{ij} \geq \delta} v_{ij} \quad (7.25)$$

bounds the number of working examples misclassified by their training examples, with probability at least 1−δ.

Note that the recurrence for each term $e_{ijky}$ depends on terms $e_{ijby}$ for all b∈B(k). So produce an ordering $\sigma_k$ on examples in C that places all children before their parents in F.

Compute terms $e_{ijky}$ in that order, to ensure that each term is computed prior to computing any term that depends on it. Next compute terms $v_{ij}$ based on terms $e_{ijby}$ for all b∈B. Then compute values $u_{ij}$ using formula (7.24), and compute the bound according to formula (7.25).

7.3 Example of Computing Values $e_{ijky}$

Consider a small example to demonstrate the recurrence for $e_{ijky}$. Use the following examples:

| example | input | output | set |
|---------|-------|--------|-----|
| 0 | 11.1 | 0 | T |
| 1 | 12.3 | 1 | T |
| 2 | 15.6 | ? | W |

The graph G of nearest neighbors has edges (0,1), (1,0), and (1,2). Removing the first edge produces a tree F, with node 1 as root and the other nodes as leaves. An ordering that places children before parents in F is (0, 2, 1). So compute terms $e_{ijky}$ for k=0, then k=2, then k=1.

For k=0, node 0 is a leaf in F. Since example 0 is in T and has output $y_0=0$, $$e_{0000} = 0, \quad (7.26)$$

meaning that, in the single-node subtree consisting of node 0, there are no leave-one-out errors in T or in W, and there are no examples in W misclassified by nearest neighbors in T. For all other i, j, and y $$e_{ij0y} = -1. \quad (7.27)$$

For k=2, node 2 is a leaf in F. Since example 2 is in W, it may have output $y_2=0$ or $y_2=1$. If $y_2=0$, then example 2 is misclassified by its nearest neighbor in T, which is example 1. So $$e_{0020} = 1. \quad (7.28)$$

If $y_2=1$, then example 2 is properly classified by example 1, so $$e_{0021} = 0. \quad (7.29)$$

For k=1, example 1 is in T, and $y_1=1$. Node 1 has two children in G—nodes 0 and 2. For child node 0, only the term $e_{000}$ is defined. For child node 2, terms $e_{0020}$ and $e_{0021}$ are defined. Each pair of terms with one from each child node can produce a term for node 1.

Begin with the pair $e_{0000}$ and $e_{0020}$. Relationships between node 1 and each child node contribute to the term. For the relationship between node 1 and node 0, the values are n=0, $y_n=0$, k=1, and $y_k=1$. With these arguments:

$c_T(0,0,1,1)=1$ because example 1 (the parent) misclassifies example 0 (the child), causing a leave-one-out error in T.

$d_T(0,0,1,1)=1$ because example 0 (the child) misclassifies example 1 (the parent), causing a leave-one-out error in T.

$c_W(0,0,1,1)=0$ and $d_W(0,0,1,1)=0$ because neither example is in W.

For the relationship between node 1 and node 2, the values are n=2, $y_n=0$, k=1, and $y_k=1$. With these arguments:

$c_T(2,0,1,1)=0$ because example 2 (the child) is not in T.

$d_T(2,0,1,1)=0$ because example 2 (the child) does not classify example 1 (the parent).

$c_W(2,0,1,1)=1$ because example 1 (the parent) misclassifies example 2 (the child), causing a leave-one-out error in W.

$d_W(2,0,1,1)=0$ because example 1 (the parent) is not in W.

The resulting term has $$i = [i_0 + c_T(0,0,1,1) + d_T(0,0,1,1)] + [i_2 + c_T(2,0,1,1) + d_T(2,0,1,1)] = [0+1+1] + [0+0+0] = 2 \quad (7.30)$$

and $$j = [j_0 + c_W(0,0,1,1) + d_W(0,0,1,1)] + [j_2 + c_W(2,0,1,1) + d_W(2,0,1,1)] = [0+0+0] + [0+1+0] = 1 \quad (7.31)$$

So the term is $e_{2111}$. The value is $$e_{2111} = h(1,1) + e_{0000} + e_{0020} = 0 + 0 + 1 = 1. \quad (7.32)$$

(The value of h(1,1) is zero since example 1 is not in W.) The value $e_{2111}=1$ means that, in the subtree of F rooted at node 1, i.e., in F, it is possible to have two leave-one-out errors in T, one leave-one-out error in W, and one example in W misclassified by its nearest neighbor in T.

Now consider the other pair of terms from children, $e_{0000}$ and $e_{0021}$. The relationship between node 1 and node 0 is the same as for the previous pair. The relationship between node 1 and node 2 changes because now $y_2=1$, so $n=2$, $y_n=1$, $k=1$, and $y_k=1$. With these arguments:

$c_T(2,1,1,1)=0$ because example 2 (the child) is not in T.

$d_T(2,1,1,1)=0$ because example 2 (the child) does not classify example 1 (the parent).

$c_W(2,1,1,1)=0$ because example 1 (the parent) properly classifies example 2 (the child), causing no leave-one-out error in W.

$d_W(2,1,1,1)=0$ because example 1 (the parent) is not in W. The resulting term has $$i = [i_0 + c_T(0,0,1,1) + d_T(0,0,1,1)] + [i_2 + c_T(2,1,1,1) + d_T(2,1,1,1)] = [0+1+1] + [0+0+0] = 2 \quad (7.33)$$

and $$j = [j_0 + c_W(0,0,1,1) + d_W(0,0,1,1)] + [j_2 + c_W(2,1,1,1) + d_W(2,1,1,1)] = [0+0+0] + [0+0+0] = 0 \quad (7.34)$$

So the term is $e_{2011}$. The value is $$e_{2011} = h(1,1) + e_{0000} + e_{0021} = 0 + 0 + 0 = 0, \quad (7.35)$$

which means that it is possible to have two leave-one-out errors in T, zero leave-one-out errors in W, and zero examples in W misclassified by nearest neighbors in T. Other than $e_{2111}$ and $e_{2011}$, for all other i, j, and y $$e_{ij1y} = -1. \quad (7.36)$$

This completes the computation of $e_{ijky}$ values for this problem.

7.4 Efficient Computation

The bound can be computed using storage and time O(poly (t+w)). Computing values $e_{ijky}$ and $v_{ij}$ directly from the recurrences is inefficient. First consider values $e_{ijky}$. Recurrence (7.19) handles terms for all children of example $Z_k$ at the same time. To improve efficiency, accumulate terms from one child at a time, as follows. Define $$e \bullet \bullet_{ky} \quad (7.37)$$

to be the "slice" of values with the specified k and y and all values of i and j. To compute each slice, iterate through children $Z_b$ of $Z_k$, using a slice-sized array prev to store the accumulation over terms from children before $Z_b$ and a slice-sized array next to store the accumulation of terms from children up to and including $Z_b$. In other words, when the iteration begins for child $Z_{b*}$, $prev_{ij}$ is the value that $e_{ijky}$ would have if the subtree in F rooted at k had children $$\bigcup_{\{b \in B(k) | b < b^*\}} Z_b. \quad (7.38)$$

And when the iteration ends for child $Z_{b*}$, $next_{ij}$ is the value that $e_{ijky}$ would have if the subtree in F rooted at k had children $$\bigcup_{\{b \in B(k) | b \leq b^*\}} Z_b. \quad (7.39)$$

Compute the iteration for child $Z_{b*}$ according to the recurrence:

$$next_{ij} = \max_{\substack{(i_a, j_a, i_{b*}, y_{b*}) s.t. \\ a_{i_a, j_a} \neq -1, e_{i_{b*}, j_{b*}, y_{b*}} \neq -1, \\ i_a + i_{b*} + c_T(b^*, y_{b*}, k, y) + d_T(b^*, y_{b*}, k, y) = i, and \\ j_a + j_{b*} + c_W(b^*, y_{b*}, k, y) + d_W(b^*, y_{b*}, k, y) = j.}} prev_{i_a, j_a} + e_{i_{b*}, j_{b*}, b^*, y_{b*}}. \quad (7.40)$$

The base cases for this recurrence are the definitions for values of prev for the first child. By the definition of prev, these values should treat $Z_k$ as a leaf in F. So use the base case values given previously for terms $e_{ijky}$ for leaves in F to initialize prev.

Algorithm 7.4.1 computes an error bound efficiently. The inputs are:

Z—An array of examples, ordered such that children in F come before their parents.

B—An array of arrays B, with B[k] the array of indices b such that Z[b] is a child of Z[k] in F.

R—An array of indices b such that Z[b] is a root in F.

u—An array with u[i][j]=$u_{ij}$ as defined in Equation (7.24).

delta—The acceptable probability of the bound being invalid, δ.

The algorithm uses subprocedures:

cT, dT, cW, and dW—As defined in equations (7.13) to (7.16).

nT—Returns the nearest neighbor to an example among examples in T, i.e. $n_T(Z)$.

---

Algorithm 7.4.1

--- procedure bound(Z, B, R, u, delta)
  e[0 . . . t][0. . .w][0 . . . t+w][0 . . . 1] := −1; // Initialize all e[ ][ ][ ][ ]
  values
  to −1.
  // Compute slices, one for each example and assignment to the label
  of the example.
  for ((k, yk) in {0, . . . ,t+w} × {0,1})
    if (Z[k] in T and yk != Z[k].y) continue; // Impossible assignment,
    so skip it.
    prev[0 . . . t][0 . . . w] := −1;
    next[0 . . . t][0 . . . w] := −1;
    // Initialize prev[0][0].
    if (Z[k] in T) prev[0][0] := 0;
    if (Z[k] in W)
      Z[k].y = yk;
      if (nT(Z[k]) != Z[k].y) prev[0][0] := 1; else prev[0][0] := 0;
    end if
    // Compute the contribution for each child b of k in F.
    for ((b, yb) in B[k] × {0,1})
      if (Z[b] in T and yb != Z[b].y) continue; // impossible assignment,
      so skip it.
      if (Z[b] in W) Z[b].y := yb;
      di := cT(b,k) + dT(b,k);

-continued

Algorithm 7.4.1

```
       dj := cW(b,k) + dW(b,k);
       for ((i, j) in {0, . . . ,t} × {0, . . . ,w} such that e[i][j][b][yb] != −1)
           for ((ii, jj) in {0, . . . ,t} × {0, . . . ,w} such that prev[ii][jj] != −1)
               next[ii + i + di][jj + j + dj] = max(next[ii + i + di][jj + j +
               dj], prev[ii][jj] + e[i][j][b][yb]);
           end for (ii, jj)
       end for (i, j)
       // Prepare to compute contribution for next child b of k in F.
       prev := next;
       next[0 . . . t][0 . . . w] := −1;
   end for (b, yb)
   // Copy the slice into e[ ][ ][ ][ ].
   for ((i, j) in {0, . . . ,t}×{0, . . . ,w}) e[i][j][k][yk] = prev[i][j];
end for (k, yk)
// Combine roots: treat each root as a child of a virtual super-root.
prev[0 . . . t][0 . . . w] := −1;
next[0 . . . t][0 . . . w] := −1;
prev[0][0] := 0; // The virtual super-root introduces no errors.
// Accumulate terms over roots b in R.
for (b, i, j) in R × {0, . . . ,t} × {0, . . . ,w})
   m := max(e[i][j][b][0], e[i][j][b][1]);
   if (m!=−1)
       for ((ii, jj) in {0, . . . ,t} × {0, . . . ,w} such that prev[ii][jj]!=−1)
           next[ii + i][jj + j] := max(next[ii + i][jj + j], prev[ii][jj] + m);
       end for (ii, jj)
   end if
   prev = next;
   next[0 . . . t][0 . . . w] := −1;
end for (b, i, j)
// Maximize v over feasible u to produce a bound on error count.
v = prev;
mx := 0;
for ((i, j) in {0, . . . ,t}×{0, . . . ,w})
   if (u[i][j] >= delta) mx = max(mx, v[i][j])
end for (i, j)
return mx;
end procedure
```

Below is Java code to compute error bounds by this procedure. This excerpt of Java code uses the approach described in this section to efficiently compute all $e_{ijky}$ in methods computePossibilities and computeSlice. (Array a in the code plays the role of array prev in this section, and array b plays the role of array next.) The same technique is used to compute all $v_{ij}$ in method combineRoots. Each root is treated as a child of a virtual "super-roof". The method named bound is included to give an overview of the computation.

Java Code Excerpt to Compute Bounds for Nearest Neighbor Classifiers:

```java
public class VirtualPartitionBounder
{
    Problem p; // Handles examples, labels, neighbors, memberships in
    T and W.
    int[ ][ ][ ][ ] e; // e[i][j][k][y]'s.
    int[ ][ ] a; // a[i][j]'s to accumulate a slice over children.
    int[ ][ ] b; // b[i][j]'s to accumulate a slice over children.
    int[ ] order; // Ordering of examples with children in F before parents
    int[ ][ ] children; // children[k][ ] is a list of children of k in F
    int[ ] roots; // Examples that are roots in F
    /**
    * Constructor.
    **/
    public VirtualPartitionBounder(Problem p)
    {
        this.p = p;
        this.e = new int[p.sizeT( )+1][p.sizeW( )+1][p.sizeTuW( )][2];
        this.a = new int[p.sizeT( )+1][p.sizeW( )+1];
        this.b = new int[p.sizeT( )+1][p.sizeW( )+1];
    }
    /**
```

-continued

```java
    * Returns a bound on the number of errors on W by T, with probability
    * of bound failure at most delta.
    **/
    public int bound(double delta)
    {
        int[ ][ ] v = computePossibilities( );
        double[ ][ ] u = computeTails( );
        int m = 0;
        for (int i=0; i<u.length; i++)
            for (int j=0; j<u[i].length; j++)
            {
                if (u[i][j]>=delta) m = max(m, v[i][j]);
            }
        return m;
    }
    /**
    * Compute e-values by the slice, then combine roots to compute
    v-values.
    **/
    public int[ ][ ] computePossibilities( )
    {
        computeOrderChildrenAndRoots( ); // Compute members order,
        children, and roots.
        clearE( ); // Set all e[i][j][k][y] to −1.
        // Loop through slices.
        for (int i=0; i<order.length; i++)
        {
            int k = order[i];
            for (int yk=0; yk<2; yk++) computeSlice(k, yk, children[k]);
        }
        combineRoots( ); // Use slices for roots to compute v-values.
        return a;
    }
    /**
    * Computes a slice e[ ][ ][k][yk] by accumulating terms over children.
    **/
    private void computeSlice(int k, int yk, int[ ] kids)
    {
        clearA( ); // Set all a[i][j] to −1.
        clearB( ); // Set all b[i][j] to −1.
        // Set intial values in a by treating k as a leaf in F.
        if (p.inT(k)) // Example k is in T.
        {
            if (yk!=p.getLabel(k)) return; // Impossible label on k.
            else a[0][0] = 0; // Correct label on k.
        }
        else // Example k is in W.
        {
            p.setLabel(k, yk); // Assign label yk to k.
            if (p.isMisclassifiedByT(k)) a[0][0] = 1;
            else a[0][0] = 0;
        }
        // Accumulate terms over children.
        for (int look=0; look<kids.length; look++)
        {
            int n = kids[look]; // Get child.
            for (int yn=0; yn<2; yn++) // Label child.
            {
                if (p.inT(n) && yn!=p.getLabel(n)) continue;
                if (p.inW(n)) p.setLabel(n, yn);
                int di = p.cT(n,k) + p.dT(n,k);
                int dj = p.cW(n,k) + p.dW(n,k);
                for (int i=0; i<e.length; i++)
                    for (int j=0; j<e[i].length; j++)
                        if (e[i][j][n][yn]!=−1)
                        {
                            for (int ii=0; ii<a.length; ii++)
                                for (int jj=0; jj<a[ii].length; jj++)
                                    if (a[ii][jj]!=−1)
                                    {
                                        b[ii+i+di][jj+j+dj] = max(b[ii+i+di][jj+j+dj],
                                            a[ii][jj] + e[i][j][n][yn]);
                                    }
                        }
            }
            copyBToA( ); // Copy b to a before handling the next child.
            clearB( ); // Set all b[i][j] to −1.
        }
        insertAIntoE(k, yk);
```

-continued

```
}
/**
 * Combine roots to compute v-values. Treat each root as a child
 * of a virtual super-root.
**/
private void combineRoots( )
{
  clearA( ); // Set all a[i][j] to -1.
  clearB( ); // Set all b[i][j] to -1.
  a[0][0] = 0; // The super-root introduces no errors.
  // Accumulate terms over roots.
  for (int look=0; look<roots.length; look++)
  {
    int n = roots[look]; // Get root.
    for (int i=0; i<e.length; i++)
      for (int j=0; j<e[i].length; j++)
      {
        int v =max(e[i][j][n][0], e[i][j][n][1]);
        if (v!=-1)
          for (int ii=0; ii<a.length; ii++)
            for (int jj=0; jj<a[ii].length; jj++)
              if (a[ii][jj]!=-1)
                b[ii+i][jj+j] = max(b[ii+i][jj+j],
                  a[ii][jj] + v);
      }
    copyBToA( ); // Copy b to a before handling the next root.
  }
}
}
```

The code uses $O(tw(t+w))$ storage and $O(t^2w^2(t+w))$ time, as follows. The storage is dominated by the array e, which has size $O(tw(t+w))$. The time is dominated by the nested loops in methods computePossibilities, computeSlice, and combineRoots. Examine the nested loops in computeSlice that run for each child and possible y-value for the child. The nesting is four deep, with two loops of size t+1 and two of size w+1. So, for each child-parent relationship, the time is $O(t^2w^2)$. Note that the loops for each root in combineRoots are similar to those for each child in computeSlice. Since each of the t+w examples is a child of one example in F or a root in F, and there are at most two possible y-values for each example, the total time is $O(t^2w^2(t+w))$.

To reduce storage, discard the slice for each example after using it to compute the slice for the parent of the example in F. To reduce storage and time in most cases, store a list of nonnegative values for each slice rather than storing the slice in array form with all the −1's included. Then iterate over those lists rather than all pairs (i,j) and (ii,jj) in methods computeSlice and combineRoots.

7.5 Random Tie Breaking for Ranking

Random tie breaking for ranking, as defined in Section 4 and applied to virtual partitions in Section 6, cannot be applied to the bound returned by the algorithm above. The error count that is the bound corresponds to an assignment that maximizes the error of using training examples to classify working examples, subject to the constraints that there are i leave-one-out errors on training examples, there are j leave-one-out errors on working examples, and the counts i and j make the assignment likely even without random tie breaking. It is valid to apply random tie breaking to the assignment behind the error count that is a candidate for the bound, as explained in Section 6. However, if random tie breaking declares the assignment unlikely, then we are left without a next candidate for the bound.

To use random tie breaking, the algorithm needs to store all candidates rather than just the maximum error count candidate in each variable $e_{ijky}$ and $v_{ij}$. So instead of storing a single maximum value in each variable, store a vector indexed by error counts, with values indicating how many partial assignments (for variables $e_{ijky}$) or assignments (for variables $v_{ij}$) produce each error count. Follow the structure of the maximization algorithm, but replace maximization by accumulating candidates. Compute values $u_{ij}$ as in the maximization algorithm above, and use those values to determine which vectors $v_{ij}$ count potentially likely candidates for the bound. (Only the combinations of i and j that are likely without random tie breaking are potentially likely with random tie breaking.). Then iterate through possible error counts, in descending order. For each error count, for each candidate counted by a vector of potentially likely candidates, apply random tie breaking to the candidate. If the candidate is likely, then return it as the bound.

8. Tests

This section presents results of tests for bounding methods developed in this invention. First there are tests comparing different bounding methods. Next, there are tests to examine the joint frequencies of errors and error bounds. Then there are tests to illustrate the effect of working set size on error bounds.

8.1 Comparing Bounding Methods

Here are results of tests to compare different bounding methods on 1-nearest neighbor classification for different types of data. The different bounding methods are:

Complete—Use the complete filter.
100—Use a sample filter with 100 sample partitions.
1000—Use a sample filter with 1000 sample partitions.
10,000—Use a sample filter with 10,000 sample partitions.
LOO—Use virtual partitioning, with a filter that scores one for each leave-one-out error.
Double—Use virtual partitioning, with a filter that scores one for each example that is misclassified by both of its two nearest neighbors in T∪W.

All bounding methods use ranking with random tie breaking, as explained in Sections 4 and 6. The sample filters draw partitions without replacement.

For each type of data, there is a table of results. Each row holds results for a different value of the bound certainty parameter δ. The first column of each table shows errors from using training data as a 1-nearest neighbor classifier on working data. The other columns show differences between the bounds on error and actual error for different bounding methods.

Each cell shows a mean and standard deviation over 1000 trials. The cells in the "Error" column show mean and standard deviation of errors. The cells in subsequent columns show mean and standard deviation of difference between bound and error. For example, suppose the error has mean 0.3 and standard deviation 0.4, and a bounding method has mean 0.1 and standard deviation 0.0. This indicates that the error averages 0.3 over the 1000 trials, and the error varies quite a bit, but the bound is always exactly 0.1 greater than the actual error.

Note that the standard deviations displayed in cells are standard deviations of the values over 1000 trials. They are not standard deviations of the estimates of the means of values over 1000 trials, i.e., their large sizes do not indicate uncertainty about the accuracy of the means. Since there are 1000 trials, those standard deviations are about ⅓₃ of the ones shown, indicating that most differences in means for different bounding methods in the tests below are statistically significant.

Each row of each table is based on the same 1000 trials, but different rows are based on different sets of trials. For each trial, a size t+w subset of examples is selected at random from a data set. A size-t subset is selected at random to form the training set T, and the remaining w examples form the working set W. The error is computed, and each bounding method is applied to (T,W) to compute an error bound. The error is subtracted from each bound, and the differences are accumulated into the statistics for the bounding methods. In each row, we show the least mean among bounding methods in bold print.

All tests ran on an Apple Macintosh, with dual 1.42 GHz PowerPC processors and 512 MB of RAM. The longest-running tests were for the data set involving diabetes among Pima Indians, with t=200 training examples and w=15 working examples. The tests for $\delta=0.1$, $\delta=0.2$, and $\delta=0.3$ ran concurrently, taking about a day and a half for the 3000 trials, or about a minute per trial.

8.1.1 Iris Data label, so the filter recognizes the working example. On the other hand, even if the working example is the nearest neighbor of several training examples, the filter ignores the fact that the working example misclassifies those examples, because their next-nearest neighbors are other training examples with the same label. Contrast this with a filter based on leave-one-out errors. This filter would recognize the incorrectly labeled working example, but it would also recognize any nearby training examples that had the working example as nearest neighbor.

The best method for $\delta=0.2$ uses a complete filter. The best method for $\delta=0.3$ uses a sample size of 1000. For all values of $\delta$, methods using sampled filters based on 1000 and 10,000 partitions perform about as well as the method using a complete filter—the differences between them are not statistically significant. The method using a sampled filter based on 100 partitions performs slightly worse, indicating that using fewer samples for ranking allows into the likely set some assignments with high error on the working set that would be rejected by using more samples. In general, more samples give stronger bounds, but at the cost of added computation.

8.1.2 Diabetes Data

TABLE 8.1.2

Bound Methods Compared on Diabetes Data

| $\delta$ | Error | 100 | 1000 | LOO |
|---|---|---|---|---|
| 0.1 | 0.32 ± 0.12 | 0.23 ± 0.13 | 0.20 ± 0.13 | 0.26 ± 0.15 |
| 0.2 | 0.31 ± 0.12 | 0.16 ± 0.13 | 0.15 ± 0.13 | 0.20 ± 0.16 |
| 0.3 | 0.31 ± 0.12 | 0.12 ± 0.13 | 0.11 ± 0.13 | 0.16 ± 0.15 |

TABLE 8.1.1

Bound Methods Compared on Iris Data

| $\delta$ | Error | Complete | 100 | 1000 | 10,000 | LOO | Double |
|---|---|---|---|---|---|---|---|
| 0.1 | 0.0 ± 0.0 | 0.21 ± 0.096 | 0.23 ± 0.10 | 0.21 ± 0.097 | 0.21 ± 0.10 | 0.25 ± 0.18 | 0.11 ± 0.24 |
| 0.2 | 0.0 ± 0.0 | 0.068 ± 0.11 | 0.085 ± 0.12 | 0.068 ± 0.11 | 0.072 ± 0.11 | 0.10 ± 0.18 | 0.079 ± 0.20 |
| 0.3 | 0.0 ± 0.0 | 0.0085 ± 0.045 | 0.011 ± 0.050 | 0.0065 ± 0.040 | 0.0070 ± 0.041 | 0.042 ± 0.14 | 0.051 ± 0.16 |

Table 8.1.1 has results for a data set involving iris classification. The data set is from the repository of data sets for machine learning maintained by the University of California at Irvine, which is available online. The data set contains examples for three types of iris; we use only the examples for the first two types in order to have binary classification problems. This leaves 100 examples, with 50 from each class. Each example has four input dimensions. We use t=40 training examples and w=4 working examples for each trial. The iris data are easy to classify, as indicated by the fact that the errors are always zero.

For $\delta=0.1$, the best method is virtual partitioning with a filter based on whether the two nearest neighbors to an example both misclassify the example. To understand why this filter is effective for data sets that are easy to classify, imagine a lone working example in the midst of many training examples that all have the same label. Suppose an assignment gives the opposite label to the working example. The two nearest neighbors are both training examples with the other Table 8.1.2 has results for data involving diabetes in Pima Indians. This data set is also from the UC Irvine repository. The inputs have different scales, so we normalize the data, translating and scaling each input dimension to make each input dimension have mean zero and standard deviation one. There are 768 examples, with 500 from one class and 268 from another. There are eight input dimensions. We use t=200 training examples and w=15 working examples for each trial. We use 1-nearest neighbor classification.

The error indicates that this is a challenging data set for 1-nearest neighbor classification; even a classifier that always returns the label of the class with 500 examples of the 768 in the data would have average error about 0.35. The bounding method that uses 1000 partitions in a sampled filter performs best for all three values of $\delta$. On average, that method adds error rate margins of 20% for $\delta=0.1$, about 15% for $\delta=0.2$, and about 11% for $\delta=0.3$.

8.1.3 Data with a Linear Class Boundary

TABLE 8.1.3

Bound Methods Compared on Data with a Linear Class Boundary

| δ | Error | 100 | 1000 | LOO | Double |
|---|---|---|---|---|---|
| 0.1 | 0.070 ± 0.085 | 0.22 ± 0.11 | 0.20 ± 0.10 | 0.27 ± 0.14 | 0.29 ± 0.17 |
| 0.2 | 0.060 ± 0.074 | 0.13 ± 0.094 | 0.12 ± 0.093 | 0.19 ± 0.14 | 0.22 ± 0.17 |
| 0.3 | 0.068 ± 0.080 | 0.084 ± 0.097 | 0.074 ± 0.096 | 0.13 ± 0.14 | 0.18 ± 0.17 |

Table 8.1.3 has results for randomly generated data. The data consist of 1100 examples drawn uniformly at random from a three-dimensional input cube with length one on each side. The class label is zero if the input is from the left half of the cube and one if the input is from the right half of the cube. For these tests, there are t=100 training examples and w=10 working examples, using 1-nearest neighbor classification. Once again, the method that uses a sample filter with 1000 partitions in the sample outperforms the other methods in the test. On average, the method adds error rate margins of 20% for δ=0.1, about 12% for δ=0.2, and about 7.5% for δ=0.3.

8.1.4 Data with a Nonlinear Class Boundary

TABLE 8.1.4

Bound Methods Compared on Data with a Nonlinear Class Boundary

| δ | Error | 100 | 1000 | LOO | Double |
|---|---|---|---|---|---|
| 0.1 | 0.18 ± 0.13 | 0.27 ± 0.15 | 0.24 ± 0.14 | 0.31 ± 0.17 | 0.39 ± 0.12 |
| 0.2 | 0.18 ± 0.12 | 0.17 ± 0.14 | 0.16 ± 0.14 | 0.22 ± 0.17 | 0.32 ± 0.18 |
| 0.3 | 0.16 ± 0.11 | 0.12 ± 0.13 | 0.11 ± 0.13 | 0.18 ± 0.17 | 0.28 ± 0.18 |

Table 8.1.4 shows results for randomly generated data with a nonlinear class boundary. The data have the same characteristics as in the previous test, except that each class label is determined by the XOR of whether the input is in the left half of the cube, the bottom half of the cube, and the front half of the cube. In other words, the cube is cut into eight sub-cubes, and each sub-cube has a different class than the three sub-cubes with which it shares a side. This class scheme adds some error. As in the previous test, the method that uses a sample filter with 1000 partitions in the sample outperforms the other methods in the test. The method adds error rate margins that are higher than for the previous test, i.e., about 24% for δ=0.1, about 16% for δ=0.2, and about 11% for δ=0.3.

8.1.5 Comparison to Bounds Based on VC Dimension

The test results in tables 8.1.1 to 8.1.4 show that error bounds based on worst likely assignments can be effective for small data sets. Compare these bounds to error bounds based on VC dimension (Vapnik and Chervonenkis 1971), as follows. Suppose that we train linear classifiers on the training sets for our tests. To simplify our analysis, assume that all trained classifiers are consistent, i.e., they have zero error on their training data. This consistency assumption produces stronger VC bounds, allowing us to use the bound formula (Cristianini and Shawe-Taylor 2000, p. 56):

$$\frac{2}{t}\left(d\log\frac{2et}{d} + \log\frac{2}{\delta}\right),$$

where t is the number of training examples, d is the VC dimension, which is one more than the number of input dimensions for linear classifiers, and δ is the allowed probability of bound failure. Let δ=0.3. For the iris problem, t=40 and d=5, producing bound 1.5. For the diabetes problem, t=200, d=9, and the bound is 0.65. For the problems with randomly generated data, t=100, d=4, and the bound is 0.62. Compare these bounds to those for δ=0.3 in tables 8.1.1 to 8.1.4.

8.2 Joint Frequencies of Errors and Error Bounds

TABLE 8.2.1

Bounds vs. Errors for δ = 0.1

| Error | 0.0 | 0.1 | 0.2 | 0.3 | 0.4 | 0.5 | 0.6 | 0.7 | 0.8 | 0.9 | 1.0 |
|---|---|---|---|---|---|---|---|---|---|---|---|
| 0.0 | | | 1 | 17 | 95 | 45 | 4 | | | | |
| 0.1 | | | | 41 | 187 | 88 | 1 | | | | |
| 0.2 | | | 1 | 35 | 190 | 66 | 2 | | | | |
| 0.3 | | | 1 | 19 | 95 | 36 | | | | | |
| 0.4 | | | | 10 | 34 | 8 | | | | | |
| 0.5 | | | | 1 | 14 | 4 | | | | | |
| 0.6 | | | | 2 | 2 | 1 | | | | | |
| 0.7 | | | | | | | | | | | |
| 0.8 | | | | | | | | | | | |
| 0.9 | | | | | | | | | | | |
| 1.0 | | | | | | | | | | | |

TABLE 8.2.2

Bounds vs. Errors for δ = 0.2

| Error | 0.0 | 0.1 | 0.2 | 0.3 | 0.4 | 0.5 | 0.6 | 0.7 | 0.8 | 0.9 | 1.0 |
|---|---|---|---|---|---|---|---|---|---|---|---|
| 0.0 | | | 11 | 95 | 52 | 4 | | | | | |
| 0.1 | | | 22 | 166 | 110 | 4 | | | | | |
| 0.2 | | | 22 | 168 | 102 | 7 | | | | | |
| 0.3 | | | 12 | 93 | 61 | 1 | | | | | |
| 0.4 | | | 4 | 29 | 18 | | | | | | |
| 0.5 | | | 1 | 12 | 4 | | | | | | |
| 0.6 | | | | | | | | | | | |
| 0.7 | | | | 1 | 1 | | | | | | |
| 0.8 | | | | | | | | | | | |
| 0.9 | | | | | | | | | | | |
| 1.0 | | | | | | | | | | | |

TABLE 8.2.3

Bounds vs. Errors for δ = 0.3

| Error | 0.0 | 0.1 | 0.2 | 0.3 | 0.4 | 0.5 | 0.6 | 0.7 | 0.8 | 0.9 | 1.0 |
|---|---|---|---|---|---|---|---|---|---|---|---|
| 0.0 |  |  | 43 | 87 | 14 |  |  |  |  |  |  |
| 0.1 |  | 5 | 99 | 200 | 22 | 2 |  |  |  |  |  |
| 0.2 |  | 1 | 96 | 164 | 25 |  |  |  |  |  |  |
| 0.3 |  | 2 | 56 | 91 | 10 | 1 |  |  |  |  |  |
| 0.4 |  | 2 | 26 | 33 | 4 |  |  |  |  |  |  |
| 0.5 |  |  | 5 | 7 | 2 |  |  |  |  |  |  |
| 0.6 |  |  | 2 |  |  |  |  |  |  |  |  |
| 0.7 |  |  |  | 1 |  |  |  |  |  |  |  |
| 0.8 |  |  |  |  |  |  |  |  |  |  |  |
| 0.9 |  |  |  |  |  |  |  |  |  |  |  |
| 1.0 |  |  |  |  |  |  |  |  |  |  |  |

Tables 8.2.1, 8.2.2, and 8.2.3 show bound versus error for 1000 trials using the same XOR-based random data generator used in the previous test and the same classification method, 1-nearest neighbor. These results are for a sampled filter with 1000 sample partitions. Errors are listed down the left column, and error bounds are listed across the top. The value in each cell is the number of trials that have the error indicated by the row and the bound indicated by the column. Cells with value zero are left blank.

The diagonal from the top left to the bottom right contains cells for which the error and the bound are the same. Cells below this diagonal indicate bound failure—the bound is less than the actual error. Cells above indicate bounds above actual errors. Note how the cloud of values moves toward the diagonal as δ progresses from 0.1 to 0.3.

TABLE 8.2.4

Frequencies of Bound Margins

| δ | <0.0 (failure) | 0.0 (exact) | +0.1 | +0.2 |
|---|---|---|---|---|
| 0.1 | 3.1% | 5.8% | 13.8% | 26.8% |
| 0.2 | 6.4% | 13.3% | 25.1% | 28.0% |
| 0.3 | 11.0% | 19.6% | 27.3% | 26.9% |

Table 8.2.4 summarizes the frequencies of bound margins, i.e., of differences between bound and error. A bound margin less than zero means the bounding method fails, supplying an invalid error bound. From the failure column in Table 8.2.4, observe that the actual frequency of bound failure is significantly less than δ, the allowed rate of failure. The subsequent columns indicate differences between bound and actual error: exact match, over by 0.1, and over by 0.2.

Suppose we define bound failure as a negative margin and bound success as a valid bound within 0.2 of actual error. Then for δ=0.1, we have about 3% failure and about 46% success. For δ=0.2, we have about 6% failure and about 66% success. For δ=0.3, we have 11% failure and about 74% success.

8.3 Working Set Sizes and Bounds

The next results are from tests to illustrate how working set sizes affect error bounds. In general, since the bounding methods rely on training examples to constrain the set of likely assignments and hence to constrain the error bound, having more training examples and fewer working examples produces stronger bounds. These tests illustrate this effect and compare it over some bounding methods.

These tests use the iris classification data. The bounding methods are a sampled filter with 1000 sample partitions (1000), virtual partitioning with a leave-one-out filter (LOO), and virtual partitioning with a filter that scores one for each example misclassified by both of its two nearest neighbors (Double). For δ=0.1, δ=0.2, and δ=0.3, the number of training examples is held constant at t=40 while the number of working examples w varies from three to 10.

TABLE 8.3.1

Bounds vs. Number of Working Examples for δ = 0.1

| w | 1000 | LOO | Double |
|---|---|---|---|
| 3 | 0.20 ± 0.16 | 0.23 ± 0.22 | 0.073 ± 0.21 |
| 4 | 0.21 ± 0.10 | 0.27 ± 0.18 | 0.13 ± 0.25 |
| 5 | 0.22 ± 0.084 | 0.31 ± 0.19 | 0.23 ± 0.25 |
| 6 | 0.24 ± 0.087 | 0.35 ± 0.18 | 0.30 ± 0.21 |
| 7 | 0.26 ± 0.078 | 0.39 ± 0.18 | 0.34 ± 0.21 |
| 8 | 0.29 ± 0.074 | 0.44 ± 0.17 | 0.38 ± 0.21 |
| 9 | 0.31 ± 0.076 | 0.47 ± 0.18 | 0.40 ± 0.22 |
| 10 | 0.33 ± 0.074 | 0.52 ± 0.17 | 0.45 ± 0.22 |

Table 8.3.1 shows results for δ=0.1, with the lowest mean score for a bounding method in each row in bold. Note that the double-error method is better than the other two methods for small working sets, but not for larger ones. Recall that the double-error method is most effective when each working example has as nearest neighbors training examples that agree with one another. As working set sizes increase, it becomes more likely that working examples become nearest neighbors of other working examples, weakening the double-error filter.

TABLE 8.3.2

Bounds vs. Number of Working Examples for δ = 0.2

| w | 1000 | LOO | Double |
|---|---|---|---|
| 3 | 0.027 ± 0.090 | 0.040 ± 0.15 | 0.047 ± 0.17 |
| 4 | 0.063 ± 0.11 | 0.11 ± 0.18 | 0.074 ± 0.20 |
| 5 | 0.11 ± 0.10 | 0.16 ± 0.19 | 0.10 ± 0.21 |
| 6 | 0.14 ± 0.074 | 0.21 ± 0.18 | 0.16 ± 0.24 |
| 7 | 0.15 ± 0.067 | 0.26 ± 0.19 | 0.22 ± 0.26 |
| 8 | 0.17 ± 0.074 | 0.31 ± 0.19 | 0.24 ± 0.25 |
| 9 | 0.19 ± 0.071 | 0.35 ± 0.19 | 0.29 ± 0.25 |
| 10 | 0.22 ± 0.068 | 0.40 ± 0.18 | 0.33 ± 0.25 |

Table 8.3.2 shows results for δ=0.2, with the lowest mean score for a bounding method in each row in bold. A variety of methods perform well for small working sets, but the sampled filter method works best for larger working sets.

TABLE 8.3.3

Bounds vs. Number of Working Examples for δ = 0.3

| w | 1000 | LOO | Double |
|---|---|---|---|
| 3 | 0.0017 ± 0.024 | 0.018 ± 0.11 | 0.040 ± 0.16 |
| 4 | 0.0083 ± 0.045 | 0.043 ± 0.15 | 0.057 ± 0.17 |
| 5 | 0.027 ± 0.069 | 0.068 ± 0.16 | 0.077 ± 0.17 |
| 6 | 0.047 ± 0.075 | 0.11 ± 0.18 | 0.10 ± 0.19 |
| 7 | 0.070 ± 0.075 | 0.16 ± 0.19 | 0.14 ± 0.22 |
| 8 | 0.088 ± 0.065 | 0.20 ± 0.19 | 0.18 ± 0.23 |
| 9 | 0.11 ± 0.061 | 0.24 ± 0.20 | 0.24 ± 0.24 |
| 10 | 0.13 ± 0.064 | 0.29 ± 0.19 | 0.27 ± 0.23 |

Table 8.3.3 shows results for δ=0.3, with the lowest mean score for a bounding method in each row in bold. For these tests, the sampled filter method performed best for all working set sizes. Compare values in this table to values in the previous two tables. Notice that the performance of the sampled filter method improves noticeably as δ increases. In contrast, the performance of the double-error filter does not change much with δ, especially for small working sets.

9. Efficient Error Bound for Nearest Neighbors Based on a Sampled Filter

Here is a method to bound nearest neighbor classification based on a worst likely assignment. The method uses a fixed sample filter and requires time and storage that is polynomial in the number of training and working examples. Here is an overview:

0. Select a random sample R containing K sister partitions of (T,W), excluding (T,W) itself.
1. Let $r(a)=r(T,W(a))$ be the number of errors in using nearest neighbors in T to classify examples in W(a). Let $r'(k,a)$ be the number of errors in using nearest neighbors in the training examples of the kth sister partition in R to classify the working examples in the same partition. Solve $$\max_{0 \le k \le K} \left[ \max_a r(a) \text{ such that } r(a) \le r'(k, a) \right].$$

2. Return the solution as an error bound that is valid with probability $$1 - \frac{1}{K+1}.$$

The process returns a bound that is the error for a worst likely assignment. The process rejects an assignment as unlikely if, for the assignment, the partition at hand has worse error than all K sister partitions in the sample. So the probability of rejecting the true assignment is at most one in K+1.

Refer to the subproblem in brackets in Step 1 as the constrained max problem. Maximizing over the solution of K constrained max problems accomplishes Step 1. A method to solve the constrained max problem is as follows.

Let (T',W') be the kth sister partition in the sample. Recall that the assignment determines the outputs of examples in W. Some examples from W are in T'; others are in W'. For now, suppose the entries in the assignment that determine outputs for T' are fixed and those that determine outputs for W' are allowed to vary. We will solve the constrained max problem under this simplifying assumption first Then we will maximize over all assignments to T' to fully solve the constrained max problem.

Use d=e to denote that examples d and e have equal outputs. Let t(e) be the nearest neighbor to example e among the examples in T. Let t'(e) be the nearest neighbor to example e among the examples in T'.

Consider how assignments to examples in T' affect r(a) in the constrained max problem. Let q be the number of examples in T' that have been assigned a different output than their nearest neighbor in T, i.e., $q=|\{t' \in T' \cap W | t(t') \ne t'\}|.$ Each assignment counted by q contributes one error to r(a) by introducing an error on an example in W for the nearest neighbor classifier based on T. This covers the examples in T'∩W.

Now consider how assignments to examples in W' affect r(a) and r'(k,a) in the constrained max problem. Partition W' into sets A, B, C, and D, with $A=\{w' \in W' \cap W | t'(w')=t(w')\},$ $B=\{w' \in W' \cap W | t'(w') \ne t(w')\},$ $C=\{w' \in W' \cap T | t'(w')=w'\},$ and $D=\{w' \in W' \cap T | t'(w') \ne w'\}.$ For each example in A, the classifier based on T' agrees with the classifier based on T. Assign the output to be the opposite of the classifier outputs, introducing one error for each classifier. This increases both r(a) and r'(k,a), introducing an error in r(a) without weakening the constraint that it be at most r'(k,a).

For each example in B, the classifier based on T' disagrees with the classifier based on T. Assigning the output to be the opposite of the classification based on T introduces an error in r(a) without introducing an error in r'(k,a). So this error can only be introduced if it does not violate the constraint that r(a) must be at most r'(k,a).

For each example in C, the example is from T rather than W, so the output is not determined by the assignment. Hence, the output cannot be set to affect r(a) directly. The classifier based on T' is correct, so the example does not add to the errors counted by r'(k,a).

For each example in D, the example is from T rather than W, so the output is not determined by the assignment. Hence, the output cannot be set to affect r(a) directly. The classifier based on T' is incorrect, so the example adds to the errors counted by r'(k,a). This loosens the constraint that r(a) must be at most r'(k,a), creating a budget for increases in r(a) through setting outputs for examples in B to create errors counted by r(a). This budget must also accommodate the q errors in r(a) caused by setting outputs in T' to be different from their classifications based on T.

In summary, examples in T' contribute q errors to r(a); each example in A can contribute an error to r(a), and the number of examples in D, minus q, determines how many examples in B can contribute errors to r(a). So the maximum r(a) for a fixed T' is $q+|A|+\min(|B|,|D|-q).$ If |D| is less than q, then there is no feasible solution for the fixed T' because assignments to T' introduce so many errors to r(a) that the constraint cannot be satisfied.

Now use dynamic programming to fully solve the constrained max problem, by maximizing over assignments to examples in T'. Let $\{t'_1, \ldots, t'_N\}=T' \cap W.$ Define W'(t') to be the subset of W' with nearest neighbor t' among the examples in T'. Define A(t') to be A∩W(t'), B(t') to be B∩W(t'), and D(t') to be D∩W(t').

Define the recurrence term $\forall n \in \{0, \ldots, N\},\ b \in \{0, \ldots, |W'|\},\ d \in \{-|W'|, \ldots, |W'|\}\ c_{nbd}=\max(q+|A|),$ where the maximum is over all assignments to the first n elements of T'∩W such that |B|=b and |D|-q=d for $T'=T'-\{t'_{n+1}, \ldots, t'_N\}$ and $W'=W'-[W(t'_{n+1}) \cup \ldots \cup W(t'_N)],$ and $c_{nbd}=-\infty$ if there are no such assignments to the first n elements of T'∩W.

Then the base cases of the recurrence are $$c_{0bd} = \sum_{t' \in T'-W} |A(t')|$$

for $$b = \sum_{t' \in T'-W} |B(t')|$$

and $$d = \sum_{t' \in T'-W} |D(t')|$$

$$c_{0bd} = -\infty$$

for all other b and d.

For each t' in T'∩W, let t'' be t' with output assigned to be t(t'). Let t''' be t' with output assigned to be the opposite of t(t'). Then the recurrence is $$\forall n \in \{1, \ldots, N\}, b \in \{0, \ldots, |W'|\}, d \in \{-|W'|, \ldots |W'|\}:$$

$$c_{nbd} = \max(c_{n-1, j\, b-1B(t_n'')|, d-1D(t_n'')|}, 1+c_{n-1, jb-1B(t_n''')|, d-1D(t_n''')|+1})$$

where $$C_{n-1,b,d} = -\infty$$

if b∉{0, . . . , |W'|} or d∉{-|W'|, . . . , |W'|}.

The solution to the constrained max problem is $$\max_{b \in \{0,\ldots |W'|\}, d \in \{0,\ldots, |W'|\}} [c_{N,b,d} + \min(b, d)].$$

Solve the constrained max problem for each sister partition in the sample. The maximum solution is the error bound.

The recurrence has $O(N|W|^2)$ terms, but, for each 0<i<N+1 all terms with n=i−1 can be discarded after they are used to compute all terms with n=i, because they will not be used to compute any subsequent terms. So this method requires $O(|W|^2)$ space to compute the bound. Now consider time requirements. There are K constrained max problems. Each constrained max problem requires finding the nearest neighbor in T' to each input in W', determining sizes of sets A(t'), B(t'), and C(t'), and computing the recurrence. Finding nearest neighbors requires O(|T||W|) time. Determining sizes of sets requires O(|T|+|W|) time. Computing the recurrence requires $O(N|W|^2)$ time, which is $O(|W|^3)$ since N=|T'∩W|. So the whole method requires $O(K(|T||W|+|W|^3))$ time.

10. A Single Working Example and Unknown Working Inputs

This section focuses on the case of |W|=1, i.e., a single working example, for nearest neighbor classification. In this case, it is feasible to compute the complete filter, since there are only as many sister partitions as the number of examples in the complete set, and each has only two possible assignments. We state the bound process for this case. Next, we compare it to the well-known leave-one-out error estimate (Devroye, Gyorfi, and Lugosi 1996). Then we develop an error bound for the case of a working example with an unknown input, i.e., the case of not knowing the working example.

Let w be the single working example. Here is a bound process that uses the complete filter:

0. Select a bound failure probability δ.

1. Set the output of w so that t(w)≠w.

2. Let c be the number of t∈T such that the examples in T∪w-t form a nearest neighbor classifier that correctly classifies t.

3. If $$\frac{c+1}{|T|+1} \le \delta$$

then return a bound of zero error, indicating that the nearest neighbor classifier based on T correctly classifies w. Otherwise return a (trivial) bound of one error.

With probability at least 1−δ, if the bound process indicates that the classifier is correct, then it is correct.

The value (c+1)/(|T|+1) is similar to the well-known leave-one-out error rate for a nearest neighbor classifier based on T. The leave-one-out error rate is the fraction of examples t∈T such that the nearest neighbor classifier based on T-t incorrectly classifies t. Let b/|T| be the leave-one-out error rate.

Consider the causes of differences between c+1 and b. The plus one is due to the bound process assigning the output to w that causes it to be misclassified by a nearest neighbor classifier based on T. Each other difference is caused by an example t∈T that is classified differently by a classifier based on T∪w-t than by a classifier based on T-t. For such a difference to occur, w must be the nearest neighbor to t among the examples in T∪w-t.

Let k be the number of examples t∪T such that w is the nearest neighbor to t among the examples in T∪w-t. Then $$\frac{c+1}{|T|+1} \le \frac{b+k+1}{|T|+1}.$$

For each t∈T, each example in T∪w-t is equally likely to be the nearest neighbor to t. So the expected value of k is one, which implies that the expected value of the difference between the partition error count c+1 and the leave-one-out error count b is at most two.

Now, suppose the input of w is unknown and we wish to compute an error bound. Without knowing w, we cannot compute the partition error count c+1. However, we can compute the leave-one-out error count b, combine it with a probabilistic bound on k to form a bound on b+k+1, and use that to bound c+1, as follows.

Define the influence of an example in T∪w to be the number of classifications in a leave-one-out error computation on T∪w that depend on the example, not including the classification of the example itself. In other words, the influence of an example is the number of examples that have the example as the nearest neighbor (except themselves.) The sum of influences is |T|+1. So no more than (|T|+1)/k examples can have influence k or greater. So the probability that an example from T∪w chosen at random has influence k or greater is at most 1/k.

The bound process is:

0. Select an error-based bound failure probability δ and an influence limit k.

1. Compute b, the number of leave-one-out errors for T.

2. If $$\frac{b+k+1}{|T|+1} \le \delta$$

then return a bound of zero error, indicating that the nearest neighbor classifier based on T correctly classifies w. Otherwise return a (trivial) bound of one error.

The probability that w has influence k or more is at most 1−δ−(1/k). So, with probability at least 1−δ−(1/k), the classifier is correct if the bound process indicates that.

11. Conclusion

This invention introduces a new method to compute an error bound for applying a classifier based on training examples to a set of working examples with known inputs. The method uses information from the training examples and inputs of working examples to develop a set of likely assignments to outputs of the working examples. A likely assignment with maximum error determines the bound. The method is very effective for small data sets.

In the bounds, filters translate training examples and inputs of working examples into constraints on the assignments to outputs of the working examples. Several filters are introduced in this invention. The complete filter is simple and direct; it evaluates each assignment by comparing the error caused by the training/working partition at hand to the errors caused by all other training/working partitions, rejecting the assignment as unlikely if the error for the partition at hand is especially large. The complete filter is effective because it optimizes directly over the error on the partition at hand, which is the basis for the bound. The sampled filter is an easier-to-compute variant that uses only a subset of training/working partitions rather than computing error for all of them. With a sufficient number of samples, the sampled filter performs about as well as the complete filter.

Filters based on virtual partitions reduce computation by not computing errors over partitions for each assignment. The tradeoff is that filters for virtual partitions rely on indirect measures of whether assignments are likely. This invention introduces a filter based on leave-one-out error and presents an algorithm based on that filter to efficiently compute an error bound for 1-nearest neighbor classification. This invention also introduces a filter based on whether the two nearest neighbors both misclassify an example. Tests show that this filter can be more effective than the complete filter for problems with little classification error and small numbers of working examples.

We claim:

1. A method to produce in a computer system a bound on the error of a classifier over a set of working examples, the method comprising:
   assigning multiple possible output assignments of values to examples in a working set;
   applying a filter to the assignments to determine likely assignments, by computing a ranking of the training set and working set among some possible ways to partition the combined training set and working set into a possible training set and a possible working set;
   and storing the error of a maximum-error likely assignment.

2. The method of claim 1, further comprising:
   for each of multiple partitions, training a classifier on the possible training set examples for the partition;
   for each of multiple partitions, evaluating the classifier performance on the possible working set examples for the partition to produce a score;
   and ranking partitions according to the scores.

3. The method of claim 1, further comprising:
   computing at least one leave-one-out filter to rank the training set and working set among some possible ways to partition the combined training set and working set into a possible training set and a possible working set.

4. The method of claim 1, further comprising:
   computing an epsilon-alpha estimator to produce a score to rank the training set and working set among some possible ways to partition the combined training set and working set into a possible training set and a possible working set.

5. The method of claim 1, further comprising:
   computing scores for examples based on the number of nearest neighbors that misclassify the example to rank the training set and working set among some possible ways to partition the combined training set and working set into a possible training set and a possible working set.

6. A method to produce in a computer system a bound on the error of a one-nearest-neighbor classifier, the method comprising:
   forming a recurrence based on nearest neighbor relationships among examples,
   computing the recurrence to identify the error of a maximum-error likely assignment;
   and storing the error of a maximum-error likely assignment.

7. A method to produce in a computer system a bound on the error of a nearest-neighbor classifier without reference to an input of a working example, the method comprising:
   using a method to compute an error bound based on a maximum-error likely assignment with reference to a potential working example under worst-case assumptions for the input of the potential working example;
   using the probability distribution of influence of a working example to modify the certainty of the bound;
   and storing the bound.

* * * * *